United States Patent [19]

Anstey et al.

[11] 3,885,225

[45] May 20, 1975

[54] BROAD LINE SEISMIC PROFILING

[75] Inventors: Nigel A. Anstey, Sevenoaks, Kent, England; M. Turhan Taner, Houston, Tex.

[73] Assignee: Seiscom Delta Inc.

[22] Filed: July 19, 1973

[21] Appl. No.: 380,682

[30] Foreign Application Priority Data

July 21, 1972 United Kingdom............... 34164/72

[52] U.S. Cl.................. 340/15.5 CP; 340/15.5 TA; 340/15.5 MC; 340/15.5 F
[51] Int. Cl............................................. G01v 1/22
[58] Field of Search... 340/15.5 CP, 15.5 TA, 15.5 F, 340/15.5 GC, 7 R

[56] References Cited
UNITED STATES PATENTS

| | | | |
|---|---|---|---|
| 2,981,928 | 4/1961 | Crawford et al. | 340/15.5 TA |
| 3,066,754 | 12/1962 | Johnson | 340/15.5 CD |
| 3,284,769 | 11/1966 | Skelton | 340/15.5 MC |
| 3,332,511 | 7/1967 | Silverman | 340/15.5 TA |
| 3,461,420 | 8/1969 | Silverman | 340/15.5 CD |
| 3,671,932 | 6/1972 | Holzman | 340/15.5 CD |
| 3,731,270 | 5/1973 | Penhollow | 340/15.5 MC |
| 3,746,122 | 7/1973 | Davis | 340/15.5 MC |

*Primary Examiner*—Maynard R. Wilbur
*Assistant Examiner*—H. A. Birmiel
*Attorney, Agent, or Firm*—Pravel & Wilson

[57] ABSTRACT

A new and improved seismic surveying and profiling method and apparatus to obtain information concerning the cross-dip components of reflecting subsurface interfaces.

28 Claims, 5 Drawing Figures

1ST. VIBRATOR

6

2ND. VIBRATOR
          LINE OF PROFILE
 6

3RD. VIBRATOR $\phi$ = 10 - 22 Hz
● = 22 - 34 Hz
⊖ = 34 - 46 Hz

1ST. VIBRATOR

2ND. VIBRATOR
          LINE OF PROFILE
 6

3RD. VIBRATOR

BROAD LINE SEISMIC PROFILING

BACKGROUND OF THE INVENTION

1. Field of Invention

The present invention relates to seismic surveying. The present invention is a development of the technique of seismic prospecting by pulse-compression methods. It is used to obtain what is known in the art as broad-line seismic profiles.

2. Description of Prior Art

The pulse-compression system known in the art by the trademark "Vibroseis" has been extensively used in seismic surveying. This system is disclosed in U.S. Pat. Nos. 2,688,124, 2,808,577, 2,874,795, 2,910,134 and 3,065,453. A field technique commonly used with this system included: the use of several vibrators emitting long swept-frequency signals in the seismic frequency range, the reception of the emitted signals (after reflection and refraction within the earth) by detectors spaced along a spread, and the cross-correlation of the received signals against the emitted swept-frequency signals. These operations yielded a seismic record which was then processed into a representation of a cross-section of the earth, using techniques well known in the art. In the prior practice of the system, the seismic records and the cross-section which were formed did not include any information which allowed a distinction between reflection paths confined to the vertical plane through the spread and reflection paths not so confined; they did not give three-dimensional control over the seismic record content.

Broad-line seismic profiling was one of several methods for obtaining a measure of three-dimensional control by associating a single conventional spread of detectors with several lines of seismic sources spaced laterally from the spread. The resulting reflection signals could then be processed into a single seismic cross-section with auxiliary information on the cross-dip components of the reflecting interfaces also available.

Information on cross-dip components has become of major and increasing importance to proper seismic interpretation. First, it represents protection against the mis-picking of reflections which can occur by the forcing of continuity between separated and discontinuous reflectors which are actually on different sides of the line of profile. Second, it warns against the calculation of interval velocities and layer thicknesses between interfaces which have different cross-dip components, and for which such calculations are not valid. Third, it warns against violations of the common assumption in migration techniques, that cross-dip components are negligible; if the information is sufficiently precise, it allows a rigorous three-dimensional migration.

SUMMARY OF INVENTION

Briefly, the present invention provides a new and improved method and apparatus for broad-line seismic profiling. The present invention utilizes a single spread of detectors laid in conventional fashion along a line of profile. Several vibratory sources are spaced apart transversely of the line. This spacing is such as to allow a measure of three-dimensional control. The vibrators emit their signals simultaneously, and the normal frequency bandwidth is emitted by each vibrator. However, this bandwidth is divided into several parts, and these are allocated to individual vibrators, in a sequence of separate emissions, in such a way that mutually exclusive parts are radiated by the several vibrators at any one time. The single recording of the geophone output, derived from the several vibrators operating simultaneously, may then be separated on the basis of frequency to represent recordings from each vibrator individually. These separated recordings, after summing to provide the full bandwidth of emission from each vibrator, may be utilized to provide a measure of three-dimensional control.

It is accordingly an object of the invention to provide an improved seismic technique of the pulse-compression type, yielding a measure of information on the dip of reflecting interfaces, laterally across the line of profile.

It is also an object to provide this improvement without a substantial loss of time in the field, or a substantial increase in the cost of the field work, or a sacrifice of fold of stack in common-depth-point stacking.

DESCRIPTION OF PREFERRED EMBODIMENT

Since many types of pulse-compression systems exist, the present invention is not generally restricted to any one of these. For the purposes of describing a preferred embodiment, the system which will be described as exemplary in the present context is that known by the trademark: Vibroseis.

Figure 1:
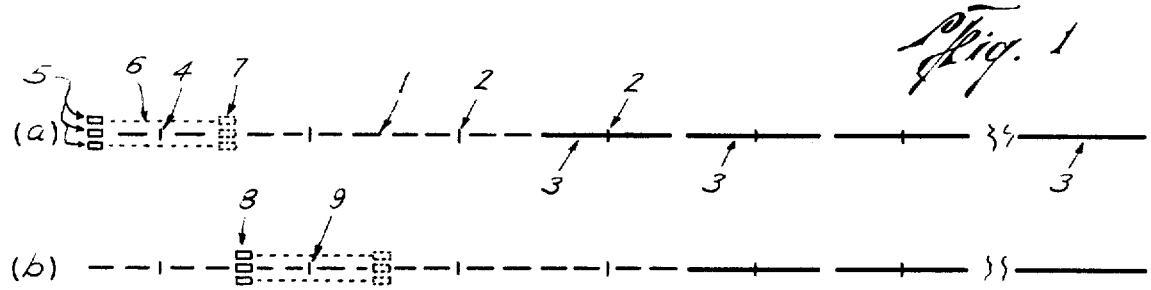
FIG. 1 illustrates a common method of operation in the prior art, using vibratory sources.

FIG. 1 depicts a common prior art Vibroseis field technique. A line of profile is illustrated at 1. The seismic line of profile 1 is divided into intervals typically 100m in length by marks 2. A spread of detectors, typically disposed in 24 arrays each of length 91 meters is diagramatically represented by the representative arrays 3. Offset from the nearest detector array 3 by several intervals is a source array 4. The source array 3 is shown as three vibrators 5, side by side, occupying twelve positions 6 along the array dimension (which, in this case, is taken as 91m). At each of these positions the three vibrators, in unison, emit a controlled swept-frequency signal exemplified as 10–46Hz. In the recording instruments, the signals derived from each array 3 for each of the twelve emissions are summed. From the arrangement of FIG. 1a, therefore, the final output is a 24-channel recording representing the composite signal produced by 12 sweeps from three vibrators, into 24 arrays.

The vibrators 5 are sometimes used side-by-side, as in FIG. 1a, and sometimes nose-to-tail. When they are side-by-side, the lateral separation is maintained fairly small so that cross-dipping relfections are not prejudiced.

When the 12 sweeps are recorded into the arrangement of FIG. 1a the vibrators reach a position 7. By means of a roll-along switch, the active part of the spread is now changed to that shown in FIG. 1b. The vibrators assume their positions 8 at the start of a new source array 9, and again emit 12 identical sweeps, in unison, over this array.

Thus, a second 24-channel recording is obtained, representing a sample of the subsurface structure of the earth shifted 100m horizontally along the profile, relative to that of FIG. 1a.

As is well known in the art, these recordings may then be processed to give a 12-fold common-depth-point stack and a final cross-section which purports to display the reflections occurring vertically below the line of profile 1. In fact, the presence of cross-dip in the subsurface structure means that reflection points indicated in the seismic cross-section are displaced to one side or other of this vertical plane.

Figure 2:
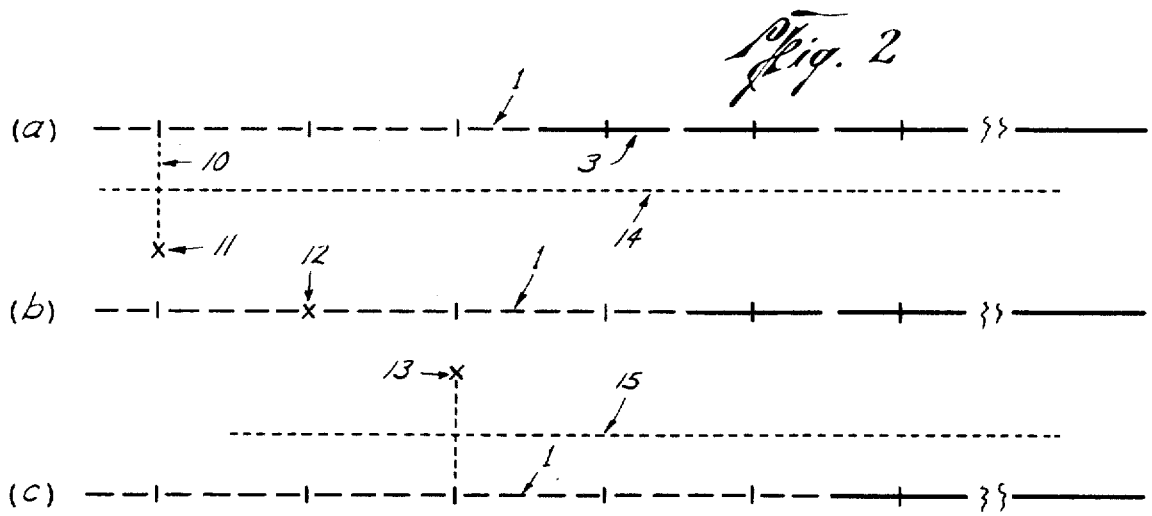
FIG. 2 illustrates a common method of wide-line profiling in the prior art.

FIG. 2 illustrates one of several known approaches to solve the cross-dip problem, as an example of wide-line profiling. FIG. 2a depicts the arrangement which yields an equivalent record to the first of the records described above in connection with FIG. 1. However, the seismic source, instead of occupying a position or a suite of positions on (or substantially on) the line of profile 1 as in FIG. 1, is offset laterally from the line of profile 1 by a distance 10. The effective source position is therefore at 11. In the case of explosive seismic exploration work with deep drilled holes, the source position 11 represents the location of the shot-point. In the case of work using surface sources or shallow holes, the source position 11 represents the center of some array (which may be similar or identical to the array shown at 4 in FIG. 1a).

FIG. 2b shows the next recording arrangement. Again, the source and the detector spread are moved one interval to the right (as in FIG. 1b). However, the effective source position is now at (or centered on) point 12, which is on the line of profile 1.

FIG. 2c shows the next recording arrangement. Again the source and the detector spread are moved one interval to the right, but the effective source position is now at 13, offset a distance 10 on the other side of the line of profile 1 from the source position 11. Subsequent recording arrangements repeat the pattern represented by FIGS. 2a–c.

Processing of the output data from the source and detector arrangement of FIGS. 2a, 2b, and 2c yields three cross-sections, each representing 4-fold common-depth-point stack. In the absence of cross-dips, the first stack represents reflections originating in the vertical plane through a line 14 in FIG. 2a, the second stack represents those reflections originating under the line of profile in FIG. 2b, and the third stack indicates those reflections originating under the line 15 in FIG. 2c. The stacked cross-sections may then be scanned laterally by an analyst, to enhance events within a prescribed range of cross-dips, and to measure these cross-dips. The distance 10 is selected to provide the best compromise between the accuracy of the dip measurement and the ambiguity represented by the well-known alias effect.

Co-pending U.S. applications Ser. Nos. 300,672 and 300,718, filed Oct. 25, 1972, describes a method by which the final output from this process may be a single cross-section depicting the line of profile, and in which the reflections exhibit (by display bias or by color) characteristics showing whether they are in front of or behind this line of profile.

Figure 3:
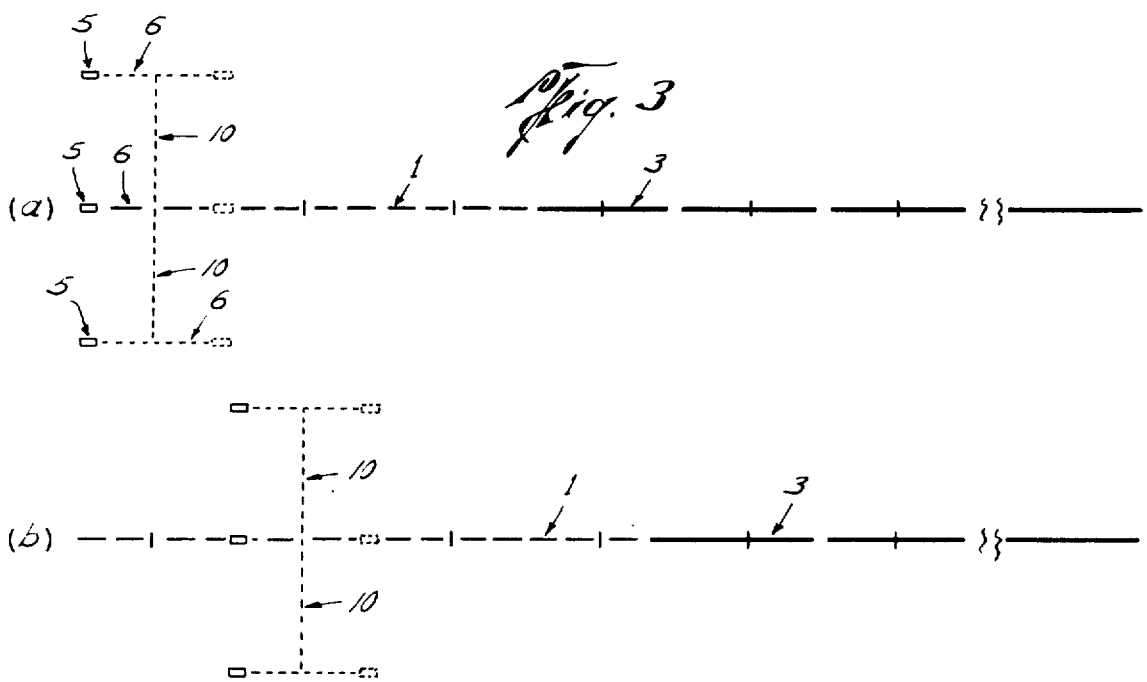
FIG. 3 illustrates a field arrangement according to the present invention.

FIG. 3 illustrates the method of the present invention. As in FIG. 1a, FIG. 3a depicts three vibrators 5 occupying 12 positions 6 over the length of a 91m source array. The detector spread 3 is identical to that of FIG. 1a.

The change of position between the first recording arrangement in FIG. 3a and the second recording arrangement illustrated in FIG. 3b is analogous to that between FIG. 1a and FIG. 1b; after each vibrator sweeps the last position of its first source array, it is moved foreward to the first position of its second source array, and continues thus. A distinction between FIG. 1 and FIG. 3 is that the vibrators are spaced apart laterally by a significant distance 10, equivalent to that used for the wide-line effect in FIG. 2. A second distinction is that the three vibrators do not radiate the same signal in unison, and do not radiate the same signal at the twelve source positions 6.

The signal to be radiated by a particular vibrator at a particular source position is selected on the basis of its frequency band. The selection is such that the full bandwidth of 10–46 Hz (in the illustrative case) is radiated from each source array, but that at any one triplet grouping of three source positions 6 the three vibrators 5 sending signals are occupying different and distinguishable frequency bands in their output frequency spectrum.

Figure 4:
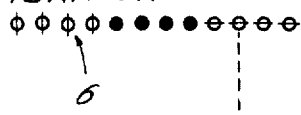
FIG. 4 illustrates one method of making bandwidth allocations to three vibrators spaced apart across the line of profile and radiating simultaneously, so that frequency discrimination may be maintained between therebetween.
Figure 4:
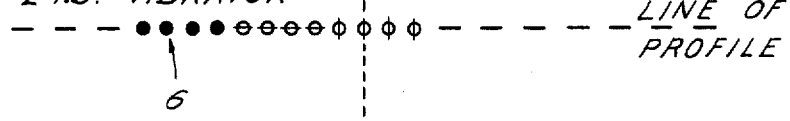
Figure 4:
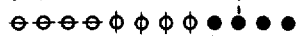

An illustration of this is obtained by dividing the frequency range or spectrum 10–46 Hz into three equal ranges or bands 10–22, 22–34 and 34–46 Hz. Then, as shown in FIG. 4, the first vibrator 5 in the triplet grouping emits a signal in the band 10–22 Hz on the first four of its 12 source positions 6, a signal in the band 22–34 Hz on the second four source positions 6, and a signal in the band 34–46 Hz on the third four source positions 6. The second vibrator 5 emits a signal in the band 22–34 Hz on the first four of its 12 source positions 6, a signal in the band 34–46 Hz on the second four source positions 6, and a signal in the band 10–22 Hz on the third four source positions 6. The third vibrator 5 emits a signal in the band 34–46 Hz on the first four of its 12 source positions 6, a signal in the band 10–22 Hz on the second four source positions 6, and a signal in the band 22–34 Hz on the third four source positions 6.

At the first source position 6, therefore, the first vibrator 5 is radiating the frequency band 10–22 Hz, the second vibrator 5 is radiating the 22–34 Hz, and the third vibrator 5 is radiating the frequency band 34–46 Hz. A standard 24-channel recording is made of the detector signals received at the detector array 3 resulting from the response of the subsurface structure, and then signals from the second, thrid and fourth source positions are sent, received and recorded in the same manner. These four recordings are then summed, either in the field or elsewhere, to give a single 24-channel recording representing the detector signals received and recorded for the first four source positions in the source array. Similarly, single 24-channel recordings are obtained for the second four positions and the third four positions. The three 24-channel recordings correspond to three vertical slices through FIG. 4.

Each of the three 24-channel recordings is then correlated against the three separate and distinct emitted signals which gave rise to it. This process effectively separates the part of the recorded signal which is due to each emission from the remaining portions of the signal. Thus, by correlating the first recording against the signal in the band 10–22 Hz emitted by the first vibrator, a reflection record is obtained representing the reflection paths from the first vibrator to the spread, within the stated bandwidth.

The correlation process, effected in this manner on the three 24-channel recordings, yields a total of nine 24-channel records. The three of these records due to the first vibrator are then summed. This gives a horizontal slice across FIG. 4: a 24-channel record having the full bandwidth 10–46 Hz, and substantially as it would have been if the first vibrator alone had been used.

Similarly, the three 24-channel records due to the second vibrator are summed, and those due to the third. The result is three new records, whose reflection content differs only to the degree that cross-dips are present in the subsurface structure.

Repetition of the above procedure for each detector array yields three 24-channel records per interval, and thus three cross-sections each representing 12-fold stack. The three cross-sections so formed represent reflection points which, in the absence of cross-dips, are respectively in front of, in the plane of, and behind the vertical through the line of profile. Each cross-section incorporates full 12-fold stack, though it has the signal-to-noise ratio associated with one vibrator only.

Subsequent processing is as described in the above discussion of the prior art. The single cross-section obtained by cross-scanning has the full signal-to-noise ratio associated with three vibrators, and full 12-fold stack. The present invention does not affect the speed of the field work, and involves only minor increase in the cost of field equipment (for automatic selection or control of the emitted signals). The field work appears the same, except that the vibrators are spaced apart laterally; the final seismic cross-section appears the same, except that it now includes auxiliary information on the cross-dips.

This illustrative embodiment of the method of the invention is not intended to limit the invention to a particular number of vibrators, detectors, source positions, fold of stack, or cross-sections, nor to limit the type or bandwidth of the radiated signal or the subdivisions thereof. The figures quoted, and the particulars of the arrangements shown in the drawings, are solely for purposes of illustration.

Figure 5:
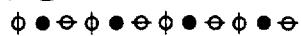
FIG. 5 illustrates a variation on the arrangement of FIG. 4 to ensure a better spatial distribution of the several frequency bands.
Figure 5:
Figure 5:
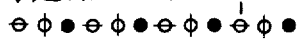

Several variations and improvements on the method described above are also within the scope of the invention. A first variation provides a modification of the source array illustrated by FIG. 4. It is clear from the figure that it may not be desirable to radiate the low frequencies from one end of the source array 6, the middle frequencies from the middle of the array 6, and the high frequencies from the other end of the array 6. This is easily taken into account by the arrangement of FIG. 5, in which the three subdivisions of the total bandwidth are radiated in turn across the whole array. Increased field storage is required for this, since the first field sum is of emissions numbers 1, 4, 7 and 10 (instead of emission 1–4), the second field sum is of emissions numbers 2, 5, 8 and 11 (instead of 5–8), and the third field sum is of emissions numbers 3, 6, 9 and 12 (instead of 9–12).

A second variation is appropriate if the radiated waveforms are short swept-frequency signals or band-limited random signals. In these cases it is undesirable to have simultaneous radiation in adjacent frequency bands. The solution, illustrated by reference to the previous example, is to divide the total bandwidth into six divisions instead of three, and to radiate the odd and even divisions in alternate emission periods. This removes any risk that the correlation process will not be able to separate the signals due to the three vibrators. This precaution is not necessary if the emissions take the form of swept-frequency signals of duration long compared to the maximum reflection time of interest.

Other variations are appropriate if considerable harmonic distortion occurs in the vibrators or in their coupling with the ground. This is important because the distortion products of the emission at 10 Hz cannot be distinguished from genuine emissions at 20 Hz, 30Hz and other integer multiple frequencies of 10Hz.

If distortion is serious, therefore, the capacity of the correlation process to separate the signals from different vibrators is impaired.

One solution to this is to resonate the vibrators. The present invention represents a general improvement over the prior art in this respect; the restriction of the bandwidth required from a vibrator on any one emission means that is becomes feasible to obtain significant resonance advantage over this narrow band. With some types of vibrator, the internal drive system may also be better optimized if the required bandwidth is decreased. The control of resonance may be made by variation of the effective mass and/or the effective compliance of the vibrator and its coupling to the ground, and may be linked automatically to the control defining the frequency band of the signal to be emitted.

A second solution to the distortion problem is provided by reducing the bandwidth of the emissions, and by choosing the resulting narrow bands to ensure that the frequency content of the distortion products of one emission is not common to any other emission being recorded at the same time. This may be illustrated by dividing the previous bandwidth of 10–46 Hz into twelve subdivisions instead of three, while still maintaining twelve emissions across the source array; clearly this means that each signal has a bandwidth of only 3 Hz and is radiated only once from each source array. The following table lists a suitable arrangement of bandwidths for each of the 12 emissions from each of the three vibrators; this arrangement not only ensures that second and third harmonics cause no ambiguity in the correlations, but also that adjacent bands are not radiated simultaneously.

| Emission No. | First vibrator, Hz | Second vibrator, Hz | Third vibrator, Hz |
|---|---|---|---|
| 1 | 10–13 | 16–19 | 43–46 |
| 2 | 16–19 | 43–46 | 10–13 |
| 3 | 43–46 | 10–13 | 16–19 |
| 4 | 13–16 | 19–22 | 34–37 |
| 5 | 19–22 | 34–37 | 13–16 |
| 6 | 34–37 | 13–16 | 19–22 |
| 7 | 22–25 | 28–31 | 40–43 |
| 8 | 28–31 | 40–43 | 22–25 |
| 9 | 40–43 | 22–25 | 28–31 |
| 10 | 25–28 | 31–34 | 37–40 |
| 11 | 31–34 | 37–40 | 25–28 |
| 12 | 37–40 | 25–28 | 31–34 |

Additional help with the distortion problem may be obtained, where the radiated signal is of swept-frequency type, by judicious alternation of upsweeps and downsweeps; by this means the time at which correlation ambiguities occur may be manipulated to be outside the range of relfection times considered.

Various modifications of the system described may be implemented to improve the accuracy of the cross-dip measurement. For example, a larger number of vibrators may be used, occupying a greater distance transverse to the spread; in this case, appropriate reductions may be made in the bandwidth of each individual emission. Alternatively, two passes may be made by three vibrators, one pass each side of the line of profile; thus six lines of source arrays may be generated. The display method of the aforementioned application by which cross-dips compiled at each depth-point may be displayed individually in color provides the maximum possible statistics for the cross-dip determination, and presents these in a form readily assimilated by the eye, so that the field effort required to obtain satisfactory cross-dip indications is minimized if this display technique is used.

The foregoing disclosure and description of the invention are illustrative and explanatory thereof, and various changes in the size, shape, and materials as well as in the details of the illustrated construction may be made without departing from the spirit of the invention.

We claim:

1. A method of obtaining cross-dip information in seismic reflection profiling by the simultaneous radiation, from a plurality of points spaced at different distances from the line of profile, of swept frequency seismic signals from each of the spaced points differing in frequency from the seismic signals of the other spaced points so that the signals, after transmission and reception along different laterally spaced travel paths, may be identified as to their particular sources and travel paths on the basis of a frequency discrimination so that the signals can be processed to obtain cross dip information.

2. In the techniques of obtaining three dimensional seismic control by broad-line profiling using vibratory sources, the method represented by the following steps:
 a. dividing the bandwidth to be radiated into a plurality of frequency bandwidth parts;
 b. establishing a spread of detectors along a prescribed line of profile;
 c. disposing a plurality of vibratory sources in a spaced-apart relationship generally transverse to the said line of profile;
 d. radiating from each such source along a distinct laterally spaced travel path a signal constrained to one of the frequency bandwidth parts, the radiations from a plurality of sources overlapping in time;
 e. deriving from the spread of detectors signals representing the composite ground vibration induced by the plurality of sources in combinations;
 f. separating the individual contributions of the plurality of sources to the composite vibration signal on the basis of a frequency discrimination to indicate the particular sources and their signal travel paths; and
 g. utilizing the separate vibration information to give a measure of the three-dimensional disposition of relfectors within the earth.

3. The method according to claim 2, and including the following further steps:
 a. making a plurality of emissions from each source, each of which emissions represents one of the plurality of frequency bandwidth parts, so that the complete bandwidth to be radiated is radiated from each source but so than no two bandwidth parts are radiated simultaneously; and
 b. after said step of separating the individual contributions of the sources, summing the emissions ascribed to each source and thereby deriving signals of full bandwidth from each source.

4. The method according to claim 3, in which the plurality of source emissions are disposed over a distance representing a desired source-array dimension.

5. The method according to claim 3, in which distortion problems are minimized by the selection of the simultaneously-radiated bandwidth parts in such manner that they do not include any harmonically-related frequencies.

6. The method according to claim 2, which also includes the step of correlating the detected signals against the emitted signals.

7. The method according to claim 2, in which said step of separating the individual contributions of the plurality of the sources on the basis of a frequency discrimination is performed by correlating the detected signals against the emitted signals.

8. The method according to claim 2, in which advantage is taken of the narrow bandwidth of each of said parts to resonate the vibratory source over that bandwidth.

9. A method of seismic profiling with seismic signals in a defined frequency spectrum to obtain cross-dip information regarding subsurface structure, comprising the steps of:
 a. sending a first seismic signal having a frequency range within a first band in the defined frequency spectrum from a first source along a first travel path through the subsurface structure;
 b. sending a second seismic signal having a frequency range within a second band distinct from the first band in the defined frequency spectrum from a second source along a second travel path different from the first travel path through the subsurface structure;
 c. recording the response reflected by the subsurface structure during travel of the first and second seismic signals along the first and second travel paths therethrough; and
 d. processing the recorded response to separate the response of the subsurface structure to the first seismic signal and the second seismic signal from each other, so that cross-dip present in the subsurface structure is indicated by differences in the separated responses.

10. The method of claim 9, wherein said step of processing comprises the steps of:
 a. correlating the recorded response with the first seismic signal to determine the response of the subsurface structure thereto; and
 b. correlating the recorded response with the second seismic signal to determine the response of the subsurface structure thereto.

11. The method of claim 9, wherein said step of processing includes the step of:
   summing the separated responses of the subsurface structure.

12. The method of claim 9 further including the step of:
   sensing the response reflected by the subsurface structure with a spread of detectors laid along a line of seismic profile.

13. The method of claim 12, wherein:
   said step of sending from a first source comprises sending a first seismic signal from a shot-point spaced apart transversely from the line of seismic profile.

14. The method of claim 12, wherein:
   said step of sending from a second source comprises sending a second seismic signal from a shot-point spaced apart transversely from the line of seismic profile.

15. The method of claim 9, wherein:
   said step of sending from a second source comprises sending the second seismic signal simultaneously with the first seismic signal.

16. The method of claim 9, further including the step of:
   sending a third seismic signal, having a frequency range within a third band distinct from the first band and second band within the defined frequency spectrum from a third source along a third travel path different from the first and second travel paths.

17. The method of claim 16, wherein said step of recording comprises recording the response of the subsurface structure to the first, second and third seismic signals and further including the step of:
   sensing the response reflected by the subsurface structure with a spread of detectors laid along a line of seismic profile.

18. The method of claim 17 wherein:
   said step of sending from a third source comprises sending a third seismic signal from a shot-point spaced apart transversely from the line of seismic profile.

19. The method of claim 9, wherein the first and second sources are each moved to new shotpoints subsequent to said steps of sending, and further including the steps of:
   a. sending the first seismic signal from the first source at its new shot-point; and
   b. sending the second seismic signal from the second source at its new shot-point.

20. The method of claim 9, wherein the first and second sources are each moved to new shot-points subsequent to said steps of sending, and further including the steps of:
   a. sending a seismic signal of like frequency band to the second seismic signal from the first source at its new shot-point; and
   b. sending a seismic signal of like frequency band to the first seismic signal from the second source at its new shot-point.

21. An apparatus for seismic profiling of subsurface geological structures with seismic signals in a defined frequency spectrum to obtain cross-dip information regarding subsurface structure, comprising:
   a. first source means for sending a first seismic signal having a frequency range within a first band in the defined frequency spectrum along a first travel path through the subsurface structure;
   b. second source means spaced from said first source means for sending a second seismic signal having a frequency range within a second band distinct from the first band in the defined frequency spectrum along a second travel path through the subsurface structure different from the first travel path;
   c. means for recording the response reflected by the subsurface structure during travel of the first and second seismic signals along the first and second travel paths therethrough; and
   d. means for processing the recorded response to separate the response of the subsurface structure to the first seismic signal and the second seismic signal from each other, so that cross-dip present in the subsurface structure is indicated by differences in the separated responses.

22. The apparatus of claim 21, wherein said means for processing comprises:
   a. means for correlating the recorded response with the first seismic signal to determine the response of the subsurface structure thereto; and
   b. means for correlating the recorded response with the second seismic signal to determine the response of the subsurface structure thereto.

23. The apparatus of claim 21, wherein said means for processing includes:
   means for summing the separated responses of the subsurface structure.

24. The apparatus of claim 22, further including:
   means for sensing the response reflected by the subsurface structure with a spread of detectors laid along a line of seismic profile.

25. The apparatus of claim 24, wherein:
   said first source means and said second source means are spaced apart transverse the seismic line of profile.

26. The apparatus of claim 21, further including:
   third source means for sending a third seismic signal having a frequency range within a third band distinct from the first band and second band within the defined frequency spectrum along a third travel path through the sub-surface structure different from the first and second travel paths.

27. The apparatus of claim 26, wherein said means for recording comprises means for recording the response of the subsurface structure to the first, second and third seismic signals and further including:
   means for sensing the response reflected by the subsurface structure with a spread of detectors laid along a line of seismic profile.

28. The apparatus of claim 27, wherein:
   said first source means, said second source means and said third source means are spaced apart transverse the seismic line of profile.

* * * * *